United States Patent [19]

Lee, Jr. et al.

[11] Patent Number: 4,584,334

[45] Date of Patent: Apr. 22, 1986

[54] POLYPHENYLENE ETHER RESIN COMPOSITIONS CONTAINING LINEAR LOW DENSITY POLYOLEFIN

[75] Inventors: Gim F. Lee, Jr., Albany; Sai P. Ting, Delmar, both of N.Y.

[73] Assignee: General Electric Company, Pittsfield, Mass.

[21] Appl. No.: 585,766

[22] Filed: Mar. 2, 1984

Related U.S. Application Data

[63] Continuation of Ser. No. 362,305, Mar. 26, 1982, abandoned.

[51] Int. Cl.$^4$ .............................................. C08K 5/51
[52] U.S. Cl. ..................................... 524/151; 525/68; 525/92; 525/132; 525/905
[58] Field of Search ............... 525/68, 905, 132, 92; 524/151

[56] References Cited

U.S. PATENT DOCUMENTS

| | | | |
|---|---|---|---|
| 3,257,357 | 6/1966 | Stamatoff | 528/212 |
| 3,257,358 | 6/1966 | Stamatoff | 528/212 |
| 3,306,874 | 2/1967 | Hay | 528/212 |
| 3,306,875 | 2/1967 | Hay | 528/212 |
| 3,943,191 | 3/1976 | Cooper et al. | 525/509 |
| 4,166,055 | 8/1979 | Lee, Jr. | 525/92 |
| 4,228,046 | 10/1980 | Lee, Jr. | 525/68 |

OTHER PUBLICATIONS

"Is Linear-Low A-'Third PE'"?, *Modern Plastics,* Nov. 1979; p. 61.

*Primary Examiner*—Jacob Ziegler
*Attorney, Agent, or Firm*—Hedman, Gibson, Costigan & Hoare

[57] ABSTRACT

Thermoplastic blends of polyphenylene ether resin and linear low density polyethylene, optionally containing an impact modifier, are described. The moldings are characterized by good physical properties, including superior impact strength, in comparison with corresponding blends containing conventional (i.e., highly branched) low density polyethylene.

10 Claims, No Drawings

POLYPHENYLENE ETHER RESIN COMPOSITIONS CONTAINING LINEAR LOW DENSITY POLYOLEFIN

This is a continuation of application Ser. No. 362,305 filed Mar. 26, 1982, abandoned.

BACKGROUND OF THE INVENTION

The polyphenylene ether resins constitute a family of high performance engineering thermoplastics possessing outstanding properties which makes them useful and desirable for many applications. These materials and methods for their preparation are described in many publications, including U.S. Pat. Nos. 3,306,874 and 3,306,875 to Allan Hay, and U.S. Pat. Nos. 3,257,357 and 3,257,358 to Gelu Stamatoff.

It is well known that the properties of polyphenylene ether resins can be materially upgraded by blending them with other polymeric materials. Polyphenylene ether resins alone, when molded, are somewhat brittle and may shatter or fracture upon impact. Also, the relatively high melt viscosity and softening point of the polymer can cause difficulty in processing. Lee, Jr. in U.S. Pat. No. 4,166,055 discloses blends of polyphenylene ether resin and polyolefin possessing good melt flow properties during molding and good impact strength after molding.

INTRODUCTION TO THE INVENTION

The discovery has now been made that a certain family of materials known in the art as linear low density polyethylene (LLDPE), when incorporated in polyphenylene ether resin and blends of polyphenylene ether resin, results in better impact strength than corresponding compositions modified with conventional highly branched low density polyethylene (LDPE), while maintaining essentially equivalent other physical properties.

DESCRIPTION OF THE INVENTION

The polyphenylene oxide resins useful in accordance with the present kinds of compositions are, as previously indicated, individually well known and readily available. There are, however, various preferred compositions components. These are primarily ones commonly having applications for which high impact strength is particularly desirable.

The preferred polyphenylene ethers are homo- and copolymers of the formula:

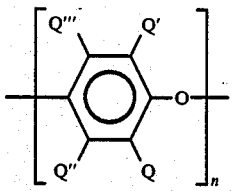

wherein Q, Q', Q" and Q'", are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q'" in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

The polyphenylene ether resin may be prepared by well known procedures, such as those described in the previously mentioned patents.

The polyphenylene ether resin is preferably but not necessarily in admixture with one or more polymeric impact modifiers. The impact modifier can be a styrene homopolymer in admixture or otherwise modified with an elastomeric material such as a natural or synthetic rubber, or a styrene containing elastomeric copolymer or terpolymer.

By way of illustration, the impact modifier may be a homopolymer such as polystyrene, polychlorostyrene, poly(alpha-methyl styrene), poly(para-methylstyrene), or styrene copolymer which has been modified by natural or synthetic rubber, for example, polybutadiene, polyisoprene, butyl rubber, EPDM rubber, natural rubber, polysulfide rubbers, polyurethane rubbers, etc., elastomeric styrene copolymers, e.g., styrene-butadiene copolymers and rubber modified styrene-maleic anhydride copolymers, styrene-acrylo-nitrile butadiene terpolymers (ABS), block copolymers of styrene and a diene in their various forms, for example, A-B, A-B-A, A-B-AB, A-B-A-B-A, etc., random or radial teleblock copolymers of these same materials, as well as hydrogenated forms of the linear, random or radial copolymers in which the aliphatic unsaturation, e.g., of the "B" (diene) block has been reduced; and admixtures of any of the above mentioned styrene homopolymers with any of the above mentioned styrene co- and terpolymers.

The linear low density polyolefins used in the present kinds of compositions are well known materials exemplified by linear low density polyethylene (LLDPE). These may be prepared from procedures described in publications, for example, in U.S. Pat. No. 4,076,698 to Arthur Anderson and Gelu Stamatoff and European Pat. Appl. No. 4,645. They are characterized by a density between about 0.89 and 0.96 gms/cc and a controlled concentration of simple side chain branching which distinguishes them from other polyolefins such as high pressure low density polyethylene and high density polyethylene prepared with Ziegler catalyst systems.

The preferred LLDPE copolymers are made from ethylene and one or more alpha olefins selected from among propylene, butene-1, heptene-1, 4-methyl, pentene-1 and octene-1. The preferred copolymers have a melt index of $\geq 0.1$ to $\leq 40$.

Especially preferred are LLDPE copolymers having a density between about 0.915 and 0.945. The density of the copolymer, at a given melt index level, is primarily regulated by the amount of the alpha-olefin monomer copolymerized with ethylene. In general, a greater content of the alpha-olefin comonomer results in a lower density for the copolymer.

The preferred copolymers have an unsaturated group content of $\leq 1$ and preferably $\geq 0.1$ to $\leq 0.3$, C=C/1000 carbon atoms and a n-hexane extractables content (at 50° C.) of less than about 3 and preferably less than 2 weight percent. The preferred materials are made by the Unipol process, which is described in Chem. Eng., Dec. 3, 1979, pp. 80–85.

In preferred embodiments, the polyolefin is present in an amount from 0.5 to 5 parts by weight, based on the total weight of the composition.

The polyphenylene ether resin and impact modifier may be present in widely variant relative proportions, for instance, from 20.1 to 1:20, and more usually, from 4:1 to 1:2.

The compositions can also contain supplementary non-resinous additives customarily employed in polyphenylene ether molding compositions to improve other physical and chemical properties. The additives include flame retardants, plasticizers, strengthening fibers (for example, glass filaments and graphite whiskers), antioxidants, mold release agents, mineral fillers, pigments, dyes, abrasion resistant components, etc. These are typically included in minor but effective amounts of between 1% and 50% by weight of the total composition.

Preparation of the compositions is accomplished by use of any of the known procedures for polyphenylene ether molding compositions, e.g., such as described in U.S. Pat. No. 4,166,055. Preferably, the ingredients are formed into a blend pre-mix, extruded as on a single or twin screw extruder, cooled, chopped or ground into molding pellets and injection molded into articles of the desired shape and size.

The following examples are presented as an illustration of the invention. These are intended as specific embodiments only and not as a limitation on the scope of the invention. Proportions are stated in parts by weight.

EXAMPLES

A composition according to the invention was prepared by tumbling 55 parts of poly(2,6-dimethyl-1,4-phenylene ether) resin (General Electric's PPO ®), 45 parts of rubber modified high impact polystyrene (Foster Grant's 834, containing about 9%, polybutadiene rubber), 1.5 parts of linear low density polyethylene (Union Carbide's GRSN-7241), 1.0 part of diphenyl decyl phosphite, 3.5 parts of isopropylated triphenyl phosphate liquid flame retardant agent (FMC's Kronitex ®50), 0.15 part of zinc oxide and 0.15 part of zinc sulfide. The resultant blend was extruded through a 28 mm Werner-Pfleiderer twin screw extruder at 570° F., cooled, chopped and the pellets were injection molded at 540° F. (180° F. mold temperature) into test bars. The physical properties are noted below.

For purposes of comparison, a control composition containing the same ingredients in the same amounts, except no polyethylene, was also prepared, molded and tested under the same conditions. In addition, a corresponding composition in which the LLDPE was replaced with the same amount of a highly branched low density polyethylene (Rexene 126) was also prepared, molded and tested. The results for these are also noted below.

TABLE

| Sample No. | PE | HDT | Izod | Gardner | MV | T.S. | T.Y. | T.E. | F.M. | F.S. | F.C. |
|---|---|---|---|---|---|---|---|---|---|---|---|
| 1* | — | 249 | 2.9 | 60 | 2600 | 8.3 | 9.9 | 42 | 390 | 15.2 | 10.5 |
| 2** | LDPE | 249 | 3.7 | 108 | 2700 | 8.6 | 9.6 | 72 | 372 | 14.6 | 11 |
| 3 | LLDPE | 249 | 3.7 | 150 | 2900 | 8.6 | 9.7 | 66 | 376 | 14.6 | 11 |

*control experiment
**comparison experiment
HDT = heat distortion temperature, °F.
Izod = Izod impact strength, ft.lbs./in. of notch
Gard. = Gardner impact strength, in.lbs.
MV = melt viscosity, poise at 282° C., 1500 sec$^{-1}$
T.S. = tensile strength, psi × $10^{-2}$
T.Y. = tensile yield, psi × $10^{-3}$
T.E. = tensile elongation, %
F.M. = flexural modulus, psi × $10^{-3}$
F.S. = flexural strength, psi × $10^{-3}$
F.C. = flow channel length of injection sample, inches It can be seen that the linear low density polyethylene (sample 3) results in a much greater increase in the Gardner impact strength, while the other properties are at least comparable to those achieved with the highly branched low density polyethylene.

The above mentioned patents and/or publications are incorporated herein by reference. Obviously, other modifications and variations are possible in light of the above disclosure. For instance, instead of poly(2,6-dimethyl-1,4-phenylene ether), copolymers such as poly(2,6-dimethyl-co-2,3,6-trimethyl-1,4-phenylene ether) can be substituted. Instead of a rubber modified high impact polystyrene such as FG834, other modifiers such as rubber modified styrene-maleic anhydride copolymer can be used. It is to be understood, therefore, that changes may be made in the particular embodiments shown which are within the full intended scope of the invention as defined in the appended claims.

We claim:

1. A thermoplastic molding composition, comprising an admixture of
    (a) a polyphenylene ether resin together with a rubber modified polystyrene; and
    (b) an amount of linear low density polyethylene sufficient to provide a higher Gardner impact strength than the same amount of a low density polyethylene.

2. A composition according to claim 1, in which the linear low density polyethylene has a density between 0.89 and 0.96 grams per cubic centimeter.

3. A composition according to claim 1, in which the linear low density polyethylene comprises a copolymer of ethylene and one or more alpha olefins.

4. A composition according to claim 3, in which the copolymer is of ethylene and one or more alpha olefins selected from propylene, butene-1, heptene-1, 4-methyl pentene-1 and octene-1.

5. A composition according to claim 3, in which the copolymer of ethylene and alpha-olefins has a melt index of ≧0.1 to ≦40.

6. A composition according to claim 1, which comprises an admixture of the polyphenylene ether resin and the rubber modified polystyrene in a weight ratio between 20:1 and 1:20.

7. A composition according to claim 6, which comprises an admixture of the polyphenylene ether resin and the rubber modified polystyrene in a weight ratio between 4:1 and 1:2.

8. A composition according to claim 1, in which the linear low density polyethylene is present in an amount of from 0.5 to 5 parts by weight of the total composition.

9. A composition according to claim 1, which includes a flame retardant.

10. A composition according to claim 9, in which the flame retardant is triphenyl phosphate.

* * * * *